(12) United States Patent
Nakano et al.

(10) Patent No.: US 7,081,886 B2
(45) Date of Patent: Jul. 25, 2006

(54) TOUCH PANEL, CONTROL METHOD, PROGRAM, AND STORAGE MEDIUM

(75) Inventors: Masayoshi Nakano, Machida (JP); Seiichi Kawano, Kanagawa (JP)

(73) Assignee: Lenovo (Singapore) PTE Ltd., Singapore (SG)

( * ) Notice: Subject to any disclaimer, the term of this patent is extended or adjusted under 35 U.S.C. 154(b) by 496 days.

(21) Appl. No.: 10/248,944

(22) Filed: Mar. 4, 2003

(65) Prior Publication Data
US 2003/0169239 A1    Sep. 11, 2003

(30) Foreign Application Priority Data
Mar. 6, 2002    (JP) .............................. 2002-061229

(51) Int. Cl.
*G09G 5/00* (2006.01)
*G09F 19/00* (2006.01)
(52) U.S. Cl. ........................................ 345/173; 702/94
(58) Field of Classification Search ........ 345/173–179; 178/18.01–11; 324/132; 702/94, 95
See application file for complete search history.

(56) References Cited

U.S. PATENT DOCUMENTS

| 4,710,758 A | * | 12/1987 | Mussler et al. ............. 345/178 |
| 6,597,384 B1 | * | 7/2003 | Harrison ...................... 345/169 |
| 6,727,896 B1 | * | 4/2004 | Tsang .......................... 345/178 |

\* cited by examiner

*Primary Examiner*—Alexander Eisen
(74) *Attorney, Agent, or Firm*—John L. Rogitz

(57) ABSTRACT

A touch panel that improves operability for users is provided. The touch panel monitors and calibrates operation positions made by a user on a display screen is provided, including a mark display part that displays marks indicating operation target positions on the display screen such that the densities of the marks in the main scanning line direction or sub-scanning line direction are different in response to positions of the directions; an operation position reader part that reads operation positions on the touch panel by the user; a relative position acquisition part that obtains relative positions of the operation positions from the mark made by the user relative to a display position of the mark; and a calibration part that calibrates the position of a new operation by the user different from an operation applied to the mark based on the relative positions.

12 Claims, 10 Drawing Sheets

| Contact position | Calibration function |
|---|---|
| A ~ B | y=ax+b |
| B ~ C | y=cx+d |
| C ~ D | y=ex²+fx+g |
| ⋮ | ⋮ |

TOUCH PANEL, CONTROL METHOD, PROGRAM, AND STORAGE MEDIUM

BACKGROUND OF THE INVENTION

The invention relates to a touch panel, a control method, a program, and a storage medium. More particularly, the invention relates to a touch panel, a control method, a program, and a storage medium that calibrates operation positions by users.

For calibrating an operation position by a user, a touch panel for determining calibration amounts has been proposed in which the user operates marks displayed in evenly spaced distances on a display screen.

In such a touch panel, the calibration is generally done as an average accuracy over the entire display screen. However, differences of the operation positions of the user often fluctuate unevenly. In such cases, the above touch panel often causes operation position errors which can not be ignored.

A purpose of the present invention is to provide a touch panel, a control method, a program and a storage medium which are able to solve the above problem. The purpose is attained by combinations of aspects described in generic claims within the scope of the claimed invention. Also sub-claims define further advantageous examples according to the present invention.

BRIEF SUMMARY OF THE INVENTION

According to a first embodiment of the invention, there is provided a touch panel for monitoring and calibrating operation positions made by a user on a display screen that comprises a mark display part that displays marks indicating operation target positions on the display screen such that the densities of the marks in the main scanning line direction or sub-scanning line direction are different in response to positions of the directions; an operation position reader part that reads operation positions on the touch panel by the user; a relative position acquisition part that obtains relative positions of the operation positions to the mark by the user relative to a display position of the mark; and a calibration part that calibrates the position of a new operation by the user different from an operation applied to the mark based on the relative positions, a control method for controlling the touch panel, a program for causing a computer to control the touch panel, and a storage medium storing the program.

According to a second embodiment of the invention, there are provided a touch panel for monitoring and calibrating operation positions made by a user on a display screen that comprises a storage part that stores calibration functions corresponding to each of at least two segments that have different distances in the main scanning line direction or sub-scanning line direction on the display screen; an operation position reader part that reads operation positions on the touch panel by the user; and a calibration part that calibrates the operation position using the calibration function for a segment corresponding to the operation position and determines input coordinates for the user, a control method for controlling the touch panel, a program for causing a computer to control the touch panel, and a storage medium storing the program.

According to a third embodiment of the invention, there are provided a touch panel for monitoring and calibrating operation positions made by a user on a display screen that comprises an operation position reader part for reading operation positions on the touch panel by the user; and a calibration part for calibrating the operation positions so that the relationship between the position of the operation position in the main scanning line direction or sub-scanning line direction on the display screen and the amount of calibration for the operation position will be nonlinear, a control method for controlling the touch panel, a program for causing a computer to control the touch panel, and a storage medium storing the program.

The summary of the invention above does not mention all the essential features of the invention, but sub-combinations of these features may be also inventions.

BRIEF DESCRIPTION OF THE SEVERAL VIEWS OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Although the invention will be described in the following based on embodiments of the invention, the embodiments mentioned below are not intended to limit the invention described in the Claims, and all combinations of features to be described are not essential for a solution according to the invention.

Figure 1:
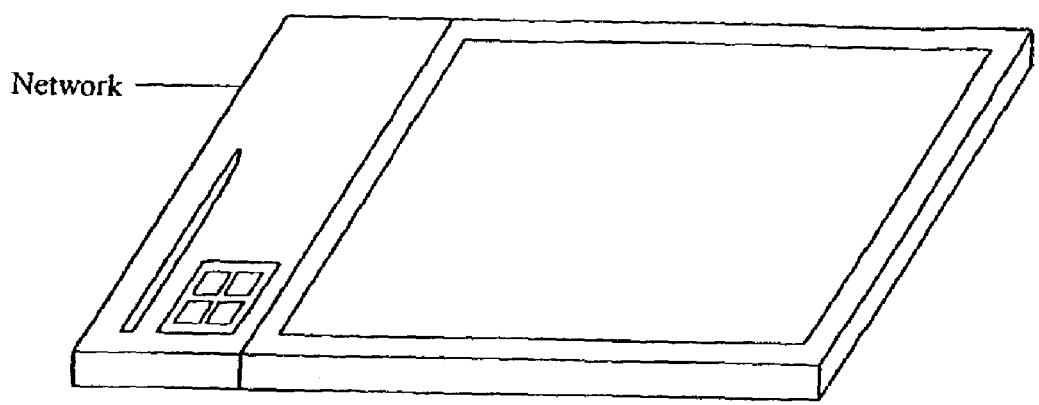
FIG. 1 generally illustrates a touch panel 10.

Referring now more particularly to the accompanying drawings, FIG. 1 generally illustrates a touch panel 10 of the embodiment. The touch panel 10 detects contacts by a user as operations and recognizes their positions. The touch panel 10 also processes information based on recognized contact positions and provides the result to the user. A contact refers to an example of operations in the context of the invention, the touch panel 10 recognizing contact positions as operation positions. The touch panel 10 may also recognize operation positions using radio wave or light that propagates right over the surface of the touch panel 10. Moreover, it may obtain positions at which a shift in temperature or electric potential due to a user's approach has been detected as operation positions.

When it receives a contact operation by a user, the touch panel 10 recognizes the contact position of the contact operation. The touch panel 10 then calibrates the contact position based on a calibration function that has been calculated in advance. The touch panel 10 also modifies settings such as the handedness of the user according to the user's designation. For example, when activated, the touch panel 10 displays a number of marks indicating contact target positions and receives contact operations by the user to each of the marks. The touch panel 10 obtains actual contact positions by the user and positions relative to the positions at which the marks are displayed. In particular, on the touch panel 10 of the embodiment, the amount of calibration to be carried out varies significantly in regions close to the edge of the panel depending on relative positions. For this reason, the touch panel 10 displays marks of higher density in regions closer to the edge of the panel and obtains relative positions. Based on the relative positions, the touch panel 10 can compute and set a calibration function for calibrating the position of a new contact operation by the user according to its position. If the touch panel 10 receives another new contact operation that is not an operation to the marks after setting the calibration function, it calibrates the contact position of the new contact operation based on the calibration function. The touch panel 10 can thus calibrate contact positions properly and improve operability for users.

Figure 2:
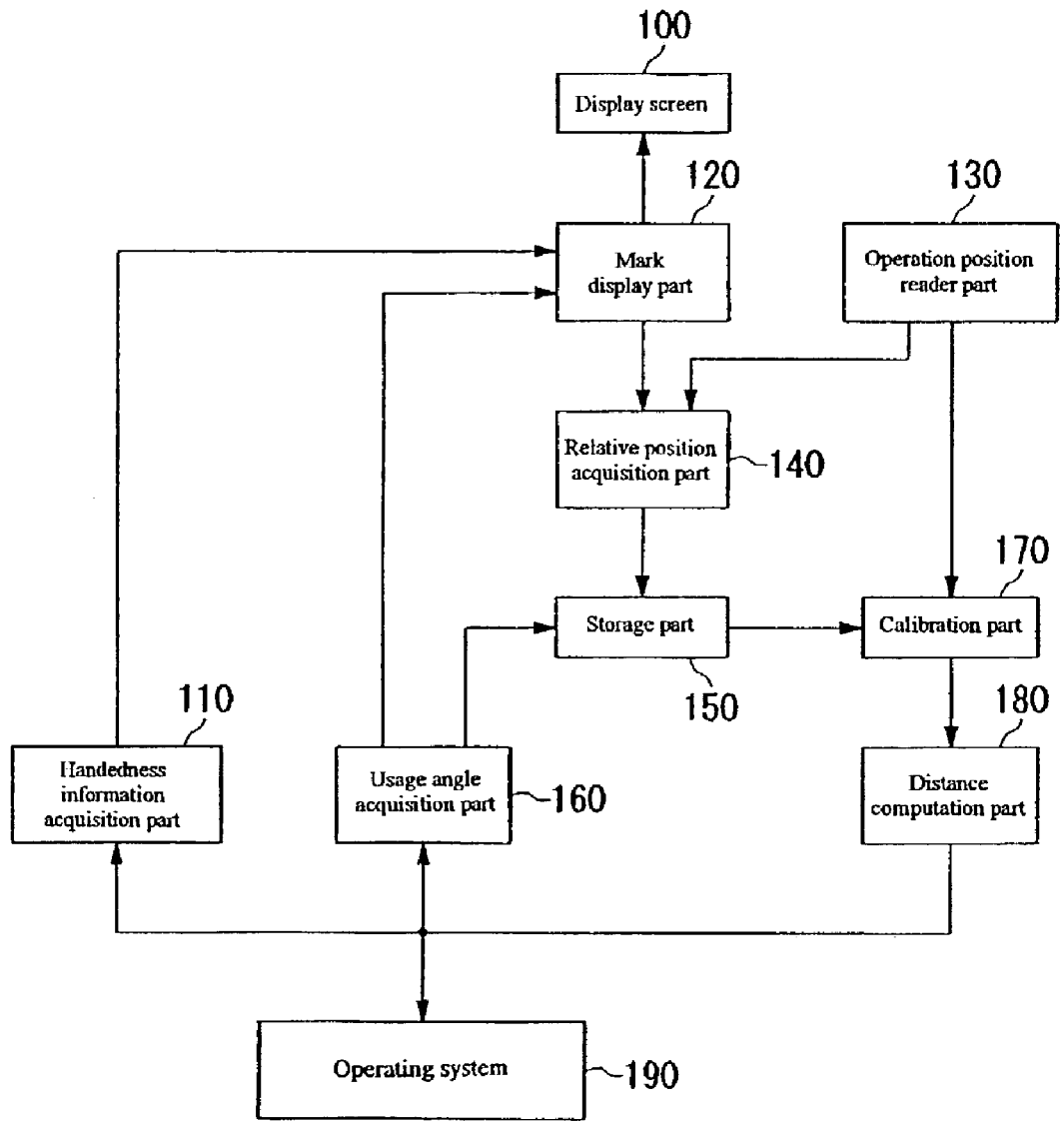
FIG. 2 shows a functional block diagram of the touch panel 10.

FIG. 2 shows a functional block diagram of the touch panel 10. The touch panel 10 comprises a display screen 100, a handedness information acquisition part 110, a mark display part 120, an operation position reader part 130, a relative position acquisition part 140, a storage part 150, a usage angle acquisition part 160, a calibration part 170, a distance computation part 180, and an operating system 190.

The display screen 100 displays contact target positions for a user according to the designation by the mark display part 120. The display screen 100 also displays objects to be selected by the user and characters or images in response to the user's contact operations.

The handedness information acquisition part 110 receives information on the user's handedness that indicates whether he/she operates the touch panel 10 with his/her left hand or right hand from the user via the operating system 190. The handedness information acquisition part 110 sends the information to the mark display part 120. The handedness information acquisition part 110 might get handedness information that has been preset by the user, or obtain it from user identification information.

The mark display part 120 displays marks on the display screen 100 in such a manner that the density of the marks in regions closer to particular edges of the display screen 100 in the main scanning line direction will be higher than that in the same direction in portions farther from those edges. The mark display part 120 sends information on the positions at which the marks are displayed to the relative position acquisition part 140. Also, when it receives information that the usage angle of the display screen 100 has been changed from the usage angle acquisition part 160, the mark display part 120 accordingly changes the display positions of the marks. In the process, the mark display part 120 may also use other directions such as the x-axis direction that is used when it specifies positions of images to be displayed as the main scanning line direction of the display screen 100.

The operation position reader part 130, on receiving a contact operation by a user, reads the contact position of the operation and sends it to the relative position acquisition part 140 or the calibration part 170. When the user makes a contact operation within a range defined by a predetermined distance from a mark, the operation position reader part 130 determines that the user made a contact operation to the mark. When it determines that the user made a contact operation to the mark, the operation position reader part 130 sends information on the contact position of the operation to the relative position acquisition part 140. Meanwhile, if it determines that the user made a contact operation to a portion other than the mark, the operation position reader part 130 sends information on the contact position of the operation to the calibration part 170. The operation position reader part 130 may also determine whether the user has made a contact operation to a mark or not based on the order of contact operations by the user, or relative positions among multiple contact operations.

The relative position acquisition part 140 receives the information on the positions of the displayed marks from the mark display part 120. The relative position acquisition part 140 then receives the information on the contact positions to the marks from the operation position reader part 130. The relative position acquisition part 140 determines the positions of the contact positions relative to the positions of the displayed marks. Based on relative positions determined for the marks, the relative position acquisition part 140 computes calibration functions and sends them to the storage part 150. For example, the relative position acquisition part 140 computes a calibration function for calibrating a position between two marks, based on positions relative to each of the display positions of the two marks.

The storage part 150 receives the calibration functions from the relative position acquisition part 140 and stores them. And the storage part 150 sends the calibration functions to the calibration part 170 at its request. When the usage angle of the display screen 100 is changed, the angle between the direction of the user's dominant hand and the direction of the main scanning line changes depending on the modified angle. The storage part 150 thus modifies a stored calibration function when it receives information that the usage angle of the display screen 100 has been changed from the usage angle acquisition part 160.

The usage angle acquisition part 160 receives information that the user has changed the usage angle of the display screen 100 from the operating system 190 and sends the information to the storage part 150 and mark display part 120.

The calibration part 170 receives the information on the contact position from the operation position reader part 130. The calibration part 170 then obtains a calibration function corresponding to the contact position from the storage part 150. The calibration part 170 calibrates the contact position by applying the calibration function to the coordinates of the contact position for the main scanning line direction and adding (or subtracting) a computed calibration amount to the coordinates, and sends the calibrated position to the distance computation part 180.

Receiving the calibrated contact position from the calibration part 170, the distance computation part 180 computes the distance between the calibrated contact position and the position which had been contacted just before a corresponding contact operation was made to the contact position. The distance computation part 180 sends information on the computed distance to the operating system 190.

When the operating system 190 receives input of information on with which hand the user will operate the touch panel from the user, it sends the information to the handedness information acquisition part 110. And when it accepts the modification of the usage angle from the user that is the angle between the direction of the main scanning line of the touch panel 10 and the direction of the user's operation, the operating system 190 sends the setting of the usage angle modification to the usage angle acquisition part 160. The operating system 190 also receives the information on the distance from the distance computation part 180. Based on the distance, the operating system 190 moves objects displayed on the touch panel 10, selects objects, and processes information associated with objects.

Figure 3:
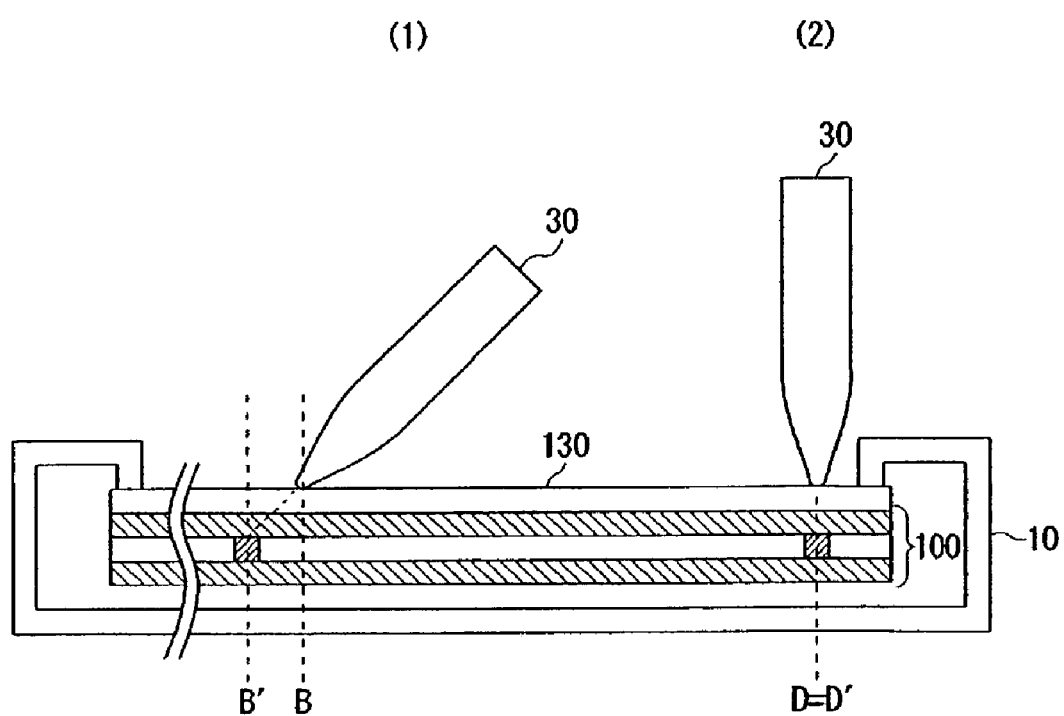
FIG. 3 shows a sectional view of the touch panel 10.

FIG. 3 illustrates an example of a cross section view of the touch panel 10 taken in its main scanning line direction. The touch panel 10 receives contact operations by a user with an indicator 30. FIG. 3(1) shows a central portion of the touch panel 10 being operated, and FIG. 3(2) shows a portion close to the edge of the touch panel 10 being operated. The figure illustrates the display screen 100 and the operation position reader part 130 among the components of the touch panel 10. A user operates the touch panel 10 by touching the operation position reader part 130 with the indicator 30.

Assume that the user attempts to make a contact operation on a contact target position (B', for example) on the display screen 100. In such a case, the user often contacts a position other than the contact target position (B, for example) because the operation position reader part 130 and the display screen 100 are thick, or the indicator 30 has a round tip. The touch panel 10 thus displays a mark at a contact target position (B', for example) beforehand and prompts the user to make a contact operation so as to obtain an actual contact position (B, for example). The touch panel 10 then determines the relative position of the contact position relative to the contact target position, and when it receives a new operation by the user, uses the relative position to calibrate the contact position of the new operation. In FIG. 3(1), since the contact position and the contact target position are not the same, when the user makes a new operation near B, the touch panel 10 calibrates the contact position to the vicinity of B'. On the other hand, in FIG. 3(2), the user can often contact the display screen 100 with the indicator 30 almost perpendicular to the screen because the user's operation may be blocked by the edge. In this case, when the user makes a new operation close to D, the touch panel 10 does not calibrates the position since a contact target position (D', for example) and the contact position (D, for example) are the same position.

In this way, the touch panel 10 changes calibration amount depending on contact positions by the user. In particular, the touch panel 10 performs more accurate calibration in regions closer to the edge at the side of the user's dominant hand as in FIG. 3(2) since the amount of calibration varies significantly in those regions. Consequently, the touch panel 10 can detect inputs just as intended by the user.

Figure 4:
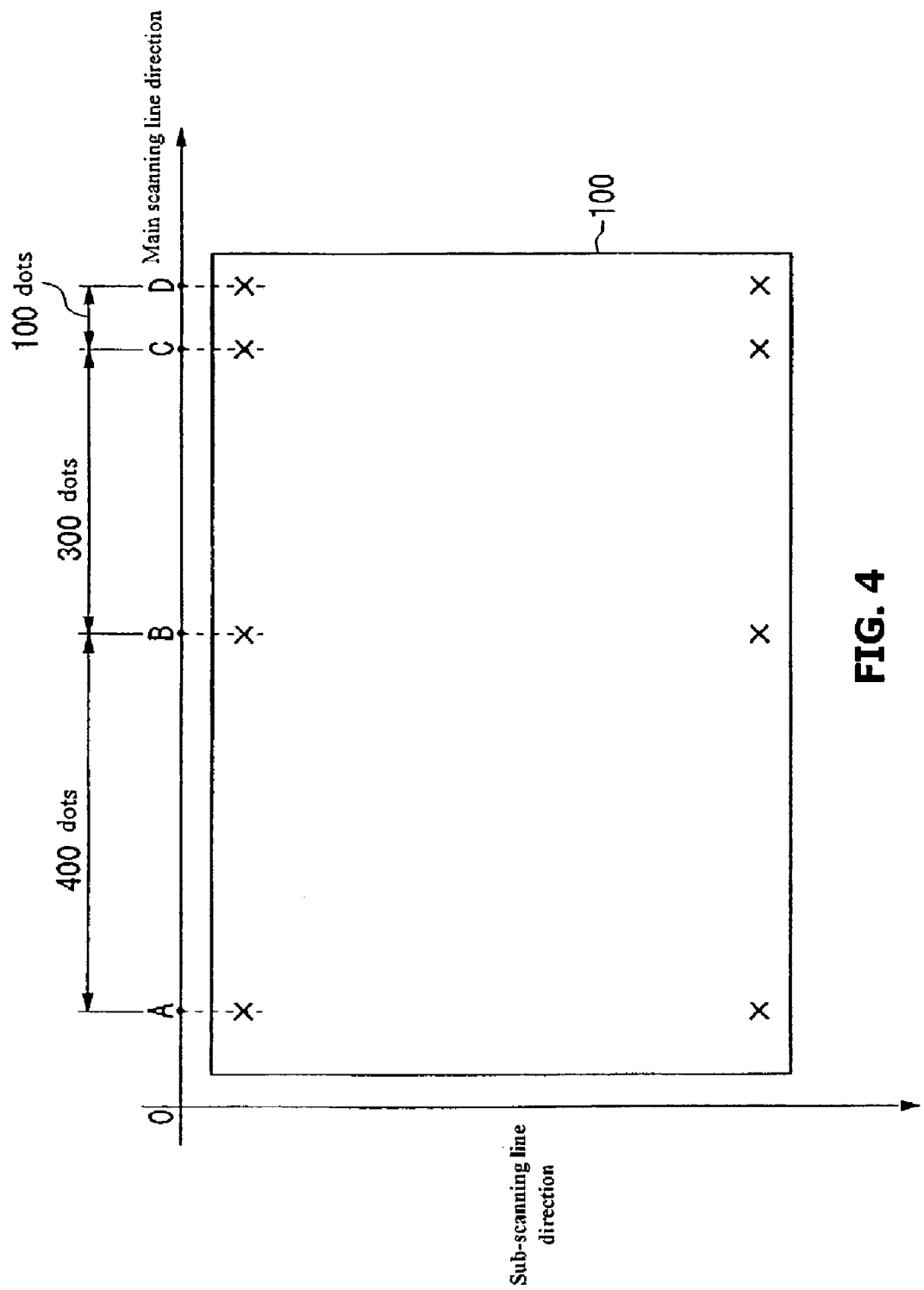
FIG. 4 illustrates an exemplary display of marks on the touch panel 10.

FIG. 4 illustrates an example of marks displayed on the touch panel 10. In the figure, the horizontal axis represents the main scanning line direction and the vertical axis represents the direction of sub-scanning lines that are orthogonal to the main scanning lines. The mark display part 120 displays marks at the positions A, B, C, and D (X's in the figure) in the main scanning line direction of the display screen 100. The mark display part 120 display the marks such that the distance between A and B is 400 dots, between B and C is 300 dots, and between C and D is 100 dots, in the direction of the main scanning lines.

The mark display part 120 of the embodiment displays multiple marks alongside on straight lines in the direction of the main scanning lines, however, the way of displaying multiple marks is not limited to the one in this figure. The mark display part 120 may display marks on straight lines in directions other than main scanning lines and sub-scanning lines, or may not display all marks on one straight line, for example.

Thus, by displaying marks of higher density in regions closer to the right edge of the mark display part 120, the touch panel 10 can get increased number of relative positions in those regions. The case in the figure can therefore particularly increase the accuracy of calibration in regions closer to the right edge that are difficult to contact when the user of the touch panel 10 is right-handed. When the user of the touch panel 10 is left-handed, the touch panel 10 displays marks of higher density in regions closer to the left edge of the mark display part 120, thereby increasing the accuracy of calibration in regions closer to the left edge that are difficult to contact.

Figures 5, 6:
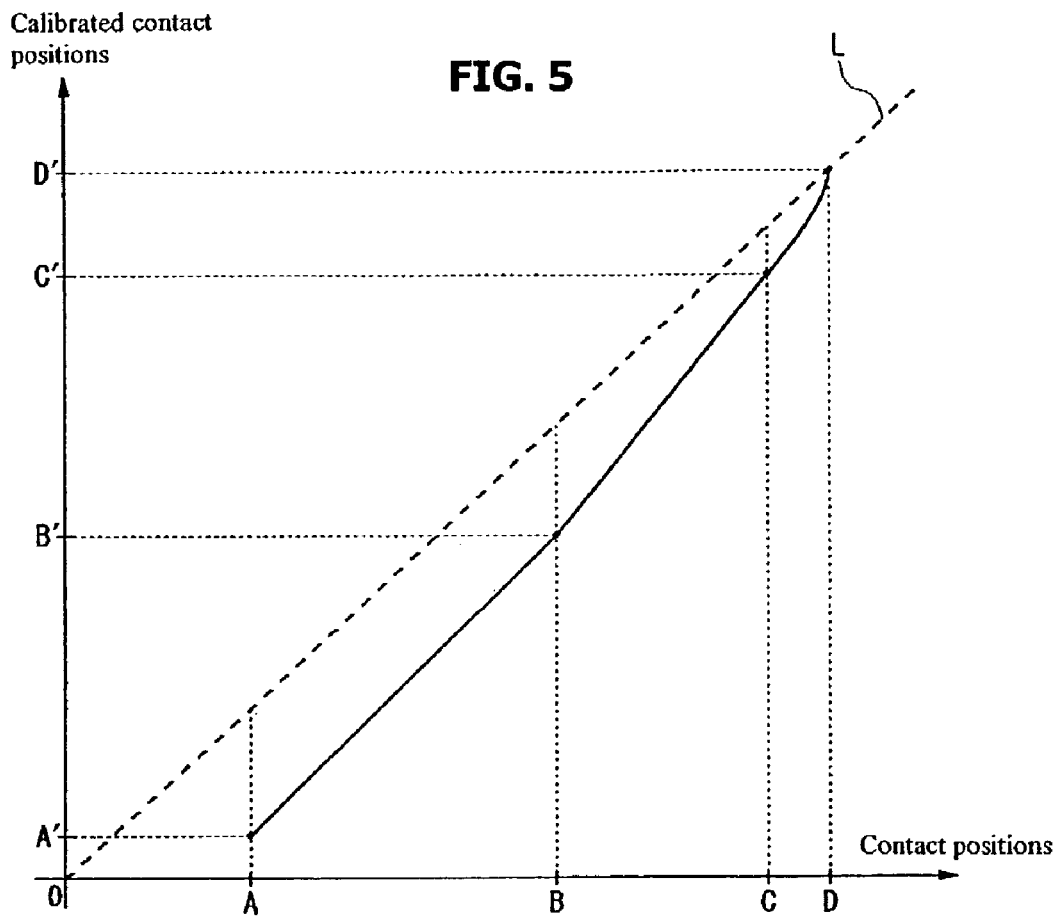
FIG. 5 shows the relationship between operation positions and calibration amount for the touch panel 10.
FIG. 6 shows the data structure of the storage part 150.

FIG. 5 illustrates an example of the calibration of contact positions on the touch panel 10 with calibration functions. The horizontal axis represents contact positions. The vertical axis indicates the contact positions calibrated by the calibration part 170. Both of the horizontal and vertical axes represent coordinates in the main scanning line direction of the touch panel 10. That is, in the present case, the calibration part 170 makes calibration in the main scanning line direction. The calibration part 170 may alternatively make calibration in directions except the main scanning lines. For example, the calibration part 170 may make calibration in the direction of the sub-scanning line, or combine calibrations in main scanning line and sub-scanning line directions.

The dotted line designated by L in FIG. 5 indicates the relationship between contact positions and calibrated contact positions when the calibration part 170 does not perform calibration in the main scanning line direction.

The calibration part 170 makes calibration based on the contact positions A, B, C, and D relative to their corresponding display positions A', B', C', and D'. When the touch panel 10 displays a mark at A' and reads a contact operation to A, and determines that a new contact operation that is not an operation to the mark has been done to A, it calibrates the contact position of the contact operation to A'. The calibration part 170 also computes a calibration function in advance that outputs a value obtained by linearly interpolating the position of A relative to A' and the position of B relative to B'. And when a new contact operation is made at a position between A and B, the calibration part 170 makes calibration using calibration amount that can be determined by applying the contact position of the new contact operation to the calibration function.

When a new contact operation is made to a position between C and D, the calibration part 170 performs calibration using a calibration amount that varies non-linearly depending on the position of the new contact operation, based on the position of B relative to B', the position of C relative to C', and the position of D relative to D'. The calibration part 170 may also change parameters for the predetermined nonlinear calibration function depending on obtained relative positions and compute a calibration function.

In, such a manner, the touch panel 10 can carry out calibration based on the positions of the user's contacts relative to display positions of marks.

FIG. 6 illustrates the data structure of the storage part 150. The storage part 150 includes a contact position field and a calibration function field. The contact position field indicates the range of coordinates of positions at which the user contacts the operation position reader part 130 in the main scanning line direction. The calibration function field indicates calibration functions for use in calibration of contact positions. For example, the calibration part 170 sets respective coefficients for calibration functions as in the figure so that contact positions can be calibrated correctly at each of A and B. When the coordinates of a contact position in the main scanning line direction that has been recognized by the operation position reader part 130 is between A and B as shown in the contact position field, the calibration part 170 substitutes the coordinates of the contact position in the main scanning direction into corresponding x in y=ax+b in the calibration function field to calculate the calibrated contact position y. The storage part 150 stores calibration functions as associated with each segment between contact positions. The storage part 150 may also store non-linear calibration functions such as y=ex2+fx+g. Instead of calibration functions, the storage part 150 might store a table for determining a calibration amount according to contact positions.

In such a manner, the storage part 150 stores calibration functions that correspond to each of at least two segments that have different distances in the main scanning line direction on the display screen. The storage part 170 therefore can determine a calibration amount immediately based on a contact position received from the operation position reader part 130.

Figure 7:
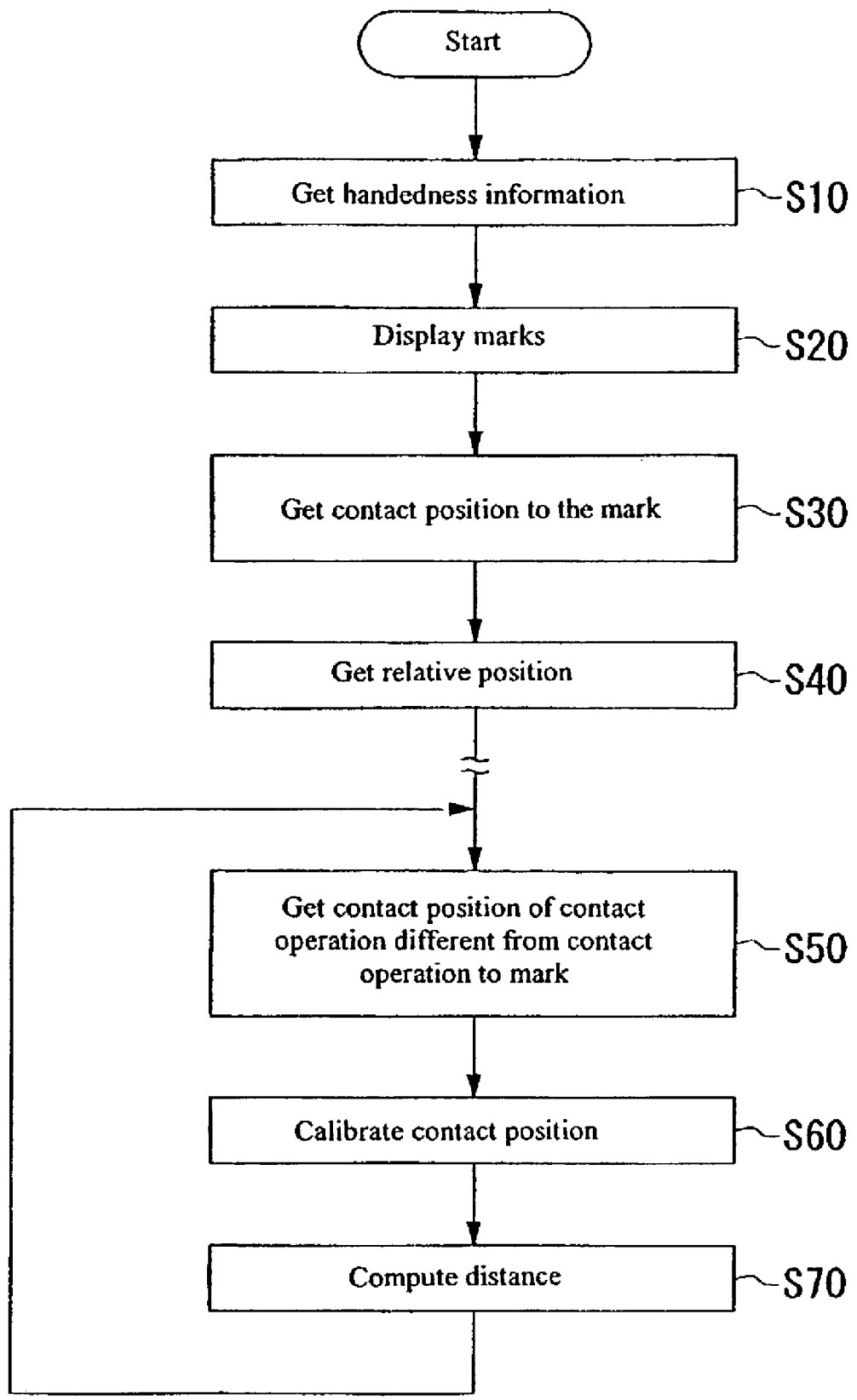
FIG. 7 is a flowchart of the process of calibrating a contact position by a user on the touch panel 10.

FIG. 7 is a flowchart showing the process of calibrating a contact position by a user on the touch panel 10. The touch panel 10 first obtains a calibration function. That is, the handedness information acquisition part 110 gets information on the user's handedness (S10). The mark display part 120 displays marks on the display screen 100 (S20). The operation position reader part 130 obtains a contact position to one of the marks (S30). The relative position acquisition part 140 obtains a relative position of the contact position relative to the display position of the mark (S40), and the storage part 150 stores a calibration function that has been calculated based on the relative position.

Then, the touch panel 10 processes as follows for a contact operation that is different from a contact operation to the mark. The operation position reader part 130 obtains a contact position (S50). The calibration part 170 calibrates the contact position using a calibration function stored at the storage part 150 (S60). The distance computation part 180 calculates the distance between the calibrated contact position and the contact position before the corresponding contact operation was done to the contact position (S70). The touch panel 10 may execute the operation in FIG. 7 when it is activated, when it is reset, or when it receives a request by a user.

Figure 8:
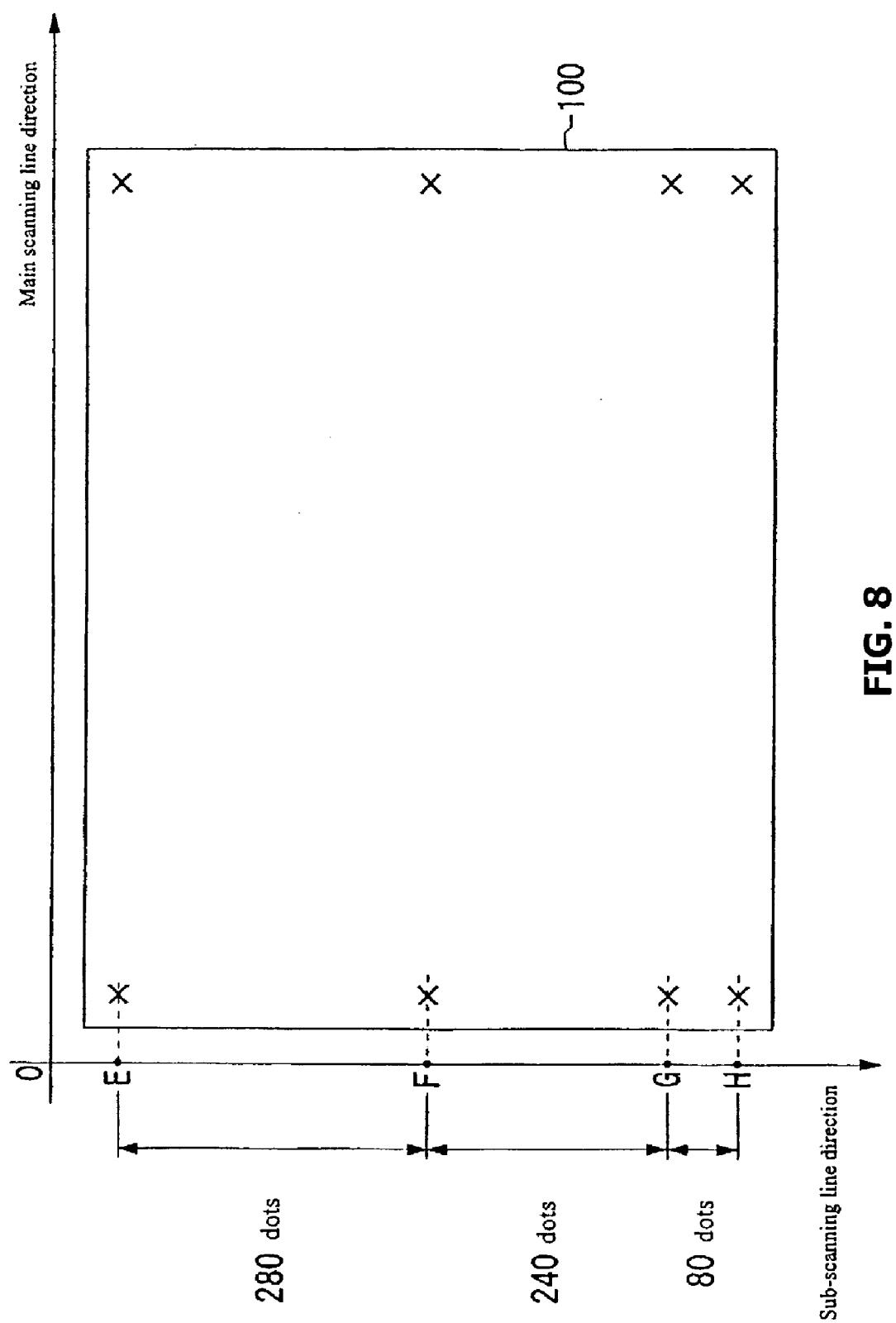
FIG. 8 illustrates an exemplary display on the display screen 100 in the first variation of the embodiment.

FIG. 8 illustrates an exemplary display on the display screen 100 in a first variation of the embodiment. The touch panel 10 displays marks on the display screen 100 in such a manner that the density of the marks in the sub-scanning line direction varies depending on positions in the direction. The horizontal axis represents the main scanning line direction, and vertical axis represents the sub-scanning line direction. The mark display part 120 displays marks E, F, G, and H on the display screen 100. The mark display part 120 displays them such that the distance between E and F is 280 dots, between F and G is 240 dots, and between G and H is 80 dots, in the direction of sub-scanning lines.

The touch panel 10 thus can obtain increased number of relative positions in regions closer to the bottom edge of the mark display part 120 by increasing the density of marks in those regions. Therefore the touch panel 10 can realize calibration with higher accuracy in regions close to the bottom edge in the sub-scanning line direction.

Figure 9:
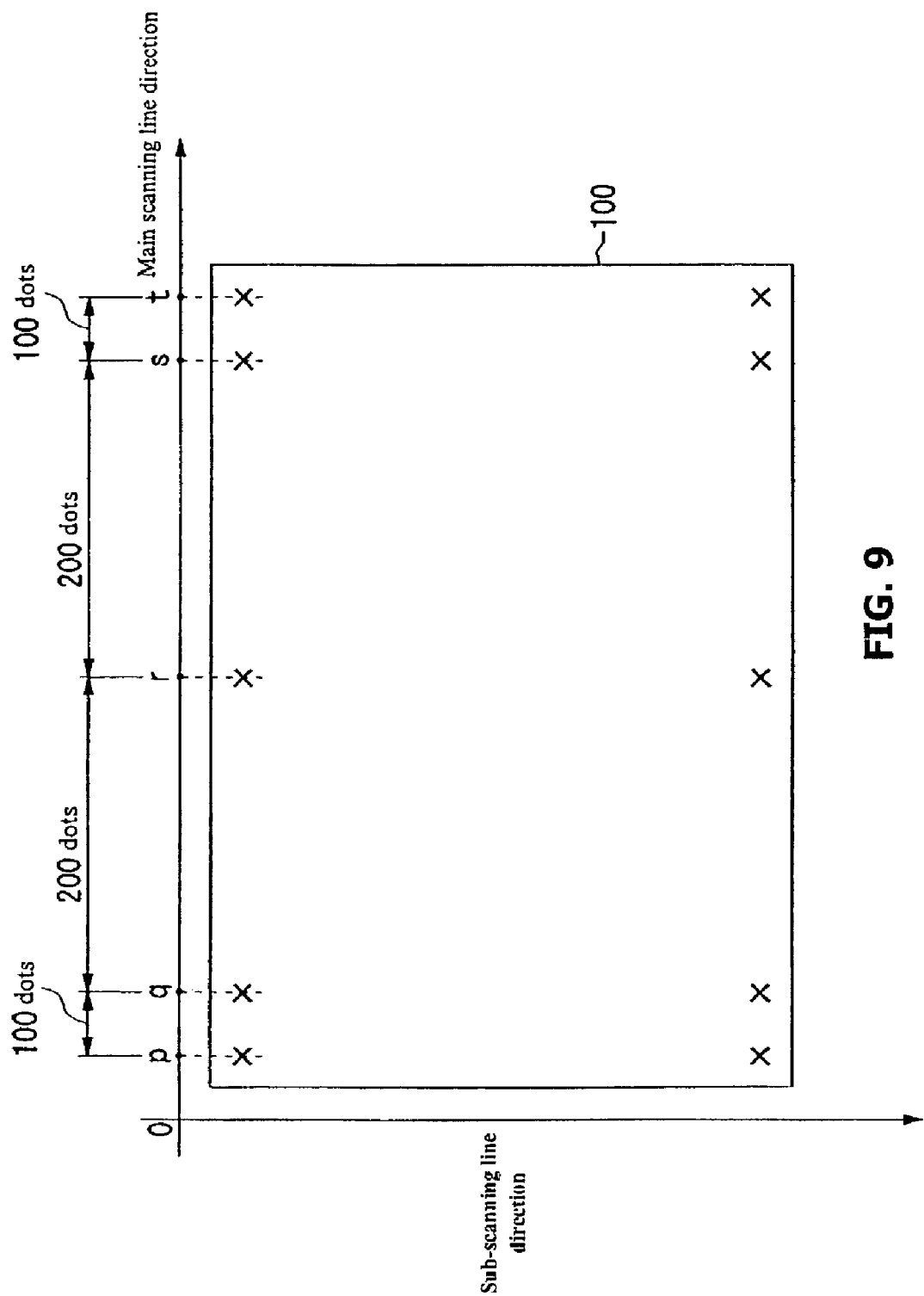
FIG. 9 illustrates an exemplary display on the display screen 100 in the second variation of the embodiment.

FIG. 9 illustrates an example of display on the display screen 100 in a second variation of the embodiment. The horizontal axis in the figure represents the main scanning line direction, and the vertical axis represents the sub-scanning line direction. The mark display part 120 displays marks p, q, r, s, and t on the display screen 100. It displays the marks such that the distance between p and q is 100 dots, between q and r is 200 dots, between r and s is 200 dots, and between s and t is 100 dots, in the main scanning line direction.

In this way, the touch panel 10 can obtain increased number of relative positions in regions closer to the left and right edges by increasing the density of marks in regions closer to the both of the side edges. The touch panel 10 thus can handle any user whether he/she is left-handed or right-handed without using information on handedness, by increasing the accuracy of calibration at portions closer to either of the left and right edges in the main scanning line direction.

Figure 10:
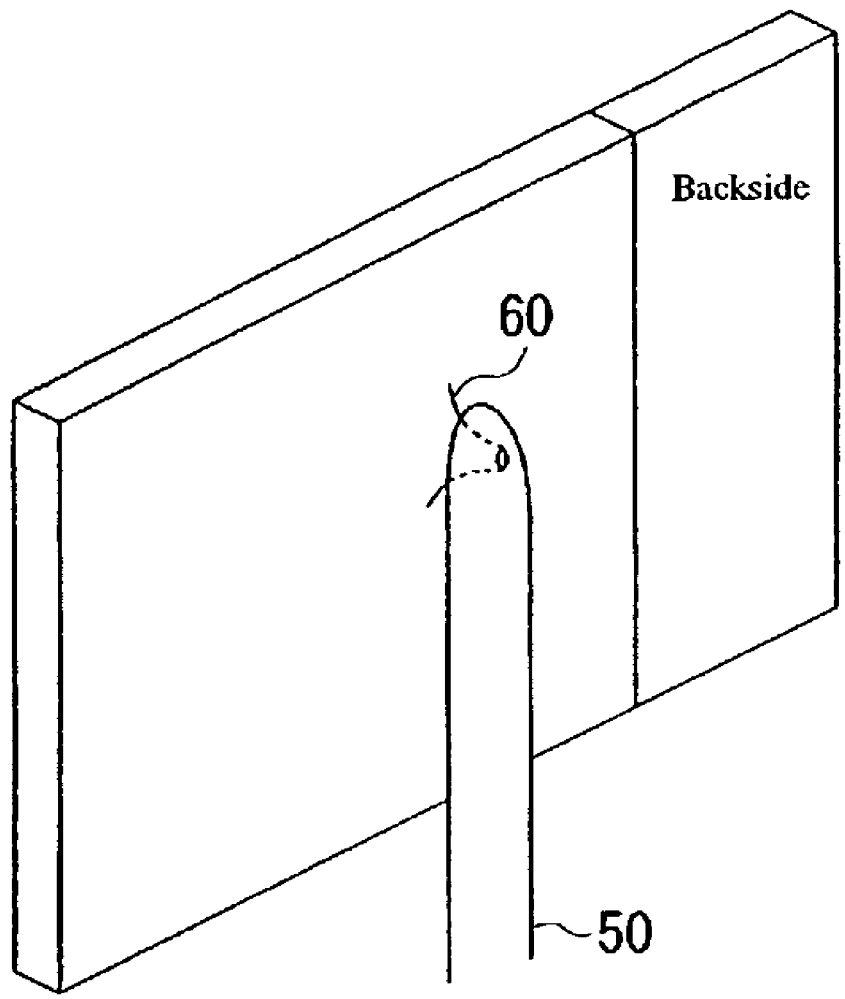
FIG. 10 generally illustrates the touch panel 10 in the third variation of the embodiment.

FIG. 10 generally illustrates the touch panel 10 in a third variation of the embodiment. The touch panel 10 further includes a support 50 and a joint 60. The support 50 supports the touch panel rotatively. When the touch panel 10 is rotated at the joint 50, the joint 60 sends information that the user changed usage angle of the display screen 100 to the usage angle acquisition part 160.

Receiving the information on the change of the usage angle of the display screen 100 from the joint 60, the usage angle acquisition part 160 included in the touch panel 10 sends the information to the storage part 150 and the mark display part 120. In this manner, the touch panel 10 can change the directions of mark display and calibration depending on the angle at which the user rotated the touch panel 10 so as to provide enhanced convenience to users.

Figure 11:
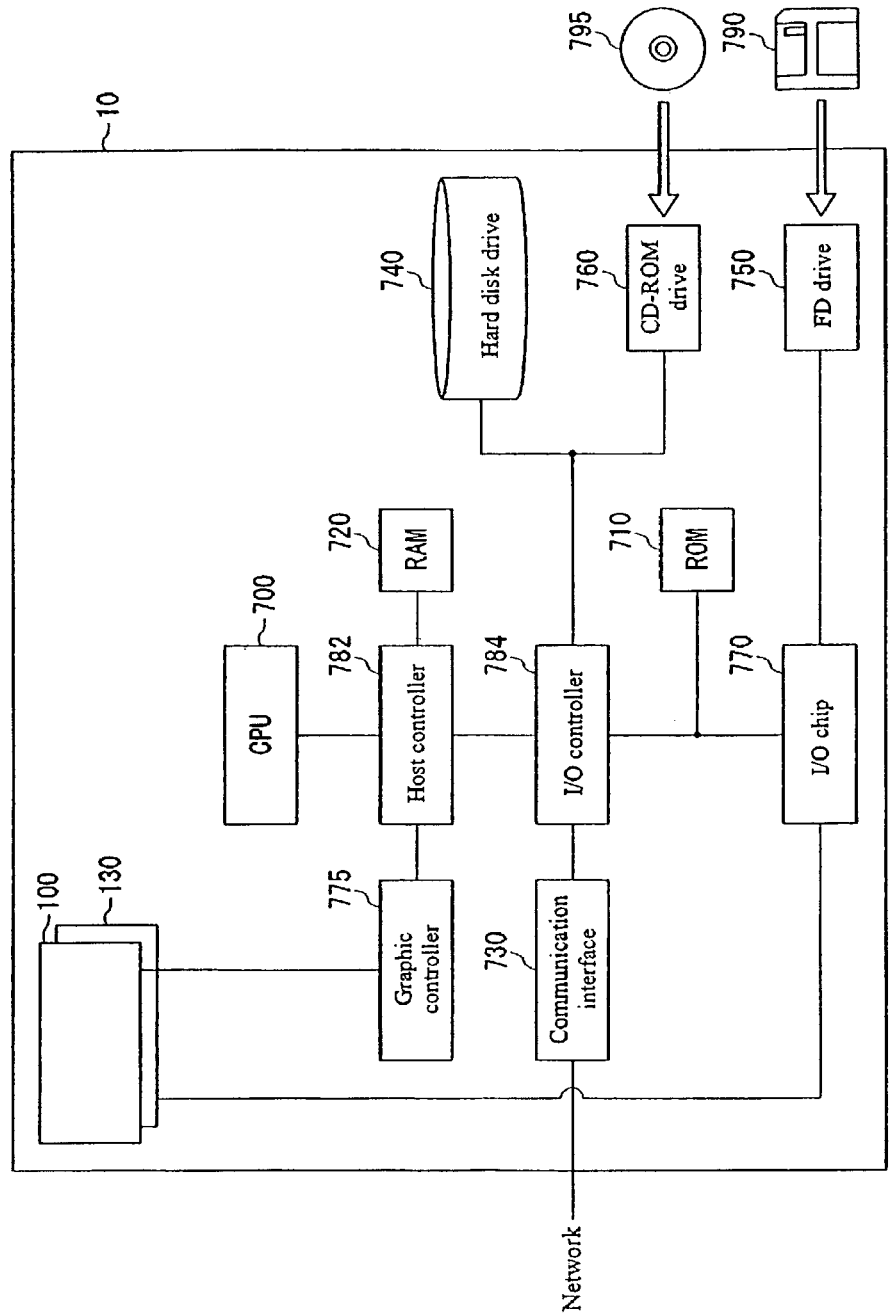
FIG. 11 shows an example of the hardware configuration of the touch panel 10.

FIG. 11 illustrates an example of the hardware configuration of the touch panel 10 of the embodiment. The touch panel 10 of the embodiment comprises the display screen 100, the operation position reader part 130, a CPU peripheral portion including a CPU 700, RAM 720, and a graphic controller 775 that are interconnected by a host controller 782, an input/output portion including a communication interface 730, a hard disk drive 740, and a CD-ROM drive 760 that are connected to the host controller 782 by an input/output controller 784, and a legacy input/output portion including ROM 710, floppy disk drive 750, and an input/output chip 770 that are connected to the input/output controller 784.

The host controller 782 connects the RAM 720 with the CPU 700 and the graphic controller 775 that access the RAM 720 at a high transfer rate. The CPU 700 operates in accordance with a program stored in the ROM 710 and RAM 720 to control each part. The graphic controller 775 obtains image data that may be generated by the CPU 700 and the like in a frame buffer provided in the RAM 720 and displays it on the display screen 100. The graphic controller 775 may alternatively include a frame buffer internally that stores image data generated by the CPU 700 and the like.

The input/output controller 784 connects the host controller 782 with the communication interface 730 that is a relatively high-speed input/output device, a hard disk drive 740, and the CD-ROM drive 760. The communication interface 730 communicates with other devices via a network. The hard disk drive 740 stores programs and data that are used by the touch panel 10. The CD-ROM drive 760 reads a program or data from a CD-ROM 795 and provides it to the input/output chip 770 via the RAM 720.

Also connected to the input/output controller 784 are ROM 710 and relatively low-speed input/output devices such as the floppy disk drive 750 and the input/output chip 770. The ROM 710 stores a boot program executed at the start-up time of the touch panel 10 by the CPU 700 or programs dependent on the hardware of the touch panel 10. The floppy disk drive 750 reads a program or data from the floppy disk 790 and provides it to the input/output chip 770 via the RAM 720. The input/output chip 770 connects the floppy disk 790, or various input/output devices via a parallel port, serial port, keyboard port, or mouse port. The input/output chip 770 also receives data corresponding to input by a user from the operation position reader part 130 and provides it to a program executed by the CPU 700. The input/output chip 770 further sends programs or data provided by the floppy disk drive 750 or the CD-ROM drive 760 to the CPU 700.

The program implementing the touch panel 10 comprises a handedness information acquisition module, mark display module, operation position reader module, relative position acquisition module, storage module, usage angle acquisition module, calibration module, distance computation module, and operating system. These modules comprise a program that cause the touch panel 10 to operate as the handedness information acquisition part 110, mark display part 120, operation position reader part 130, relative position acquisition part 140, storage part 150, usage angle acquisition part 160, calibration part 170, distance computation part 180, and operating system 190.

The program provided to the touch panel 10 is stored on the floppy disk 790, CD-ROM 795, or other storage media such as IC cards and provided by a user. The program is read from the storage medium and installed on the touch panel 10 via the input/output chip 770 to be executed at the touch panel 10.

The program or modules mentioned above may be stored on an external storage medium including optical storage media such as DVD and PD, magneto-optical storage media such as MD and the like, tape media, and semiconductor memory such as IC cards, as well as the floppy disk 790 and CD-ROM 795. It is also possible to use storage devices such as a hard disk and RAM provided in a server system connected to a dedicated communication network or the Internet as the storage medium and provide a program to the touch panel 10 via the network.

As clearly shown in the embodiments hereinbefore, the touch panel 10 displays the mark in the higher density at the region nearer to the edge region of the touch panel 10 where the calibration amounts rapidly decrease in response to the change of the contact position. Therefore, the touch panel 10 executes a calibration with high accuracy by getting more relative positions to the contact positions of the user at the region nearer to the edge of the touch panel 10 and then the touch panel 10 may provide an improved operation ability by users.

Although the invention has been described with its embodiment, the technical scope of the invention is not limited to the scope described in the embodiment above. Various modifications and improvements may be applied to the embodiment. It can be appreciated from the claims that embodiments thus modified or improved may be covered in the technical scope of the invention. For example, the mark display part 120 may display the plurality of marks indicating operation target positions on the display screen 100 such that the densities in each of the main scanning line and sub-scanning line directions vary depending on positions in the directions. Also, any or all of the functions described in the embodiment may be performed by dedicated hardware instead of the CPU 700.

According to the embodiment above, the touch panel, control method, program, and storage medium set forth in each of the following sections are realized.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a touch panel which monitors operation positions entered by a user on a display screen;
   a mark display part, coupled to said touch panel, which displays marks indicating operation target positions on the display screen such that the densities of the marks along a predetermined direction differ as a function of the position along the predetermined direction such that at least three mark densities different from each other are established;
   an operation position reader part, coupled to said touch panel, which reads operation positions entered on said touch panel;
   a relative position acquisition part which operatively couples said mark display part and said operation position reader part and which obtains a relative position of an operation position of an entered mark as read by said operation position reader part relative to the display position of the entered mark as displayed by said mark display part; and
   a calibration part, coupled to said operation position reader part, which calibrates the operation position in a new operation based on the relative positions.

2. Apparatus of claim 1, wherein said mark display part displays the marks such that the densities of the marks along the predetermined direction in regions nearer to particular edges on the display screen become higher than in regions farther from the particular edges.

3. Apparatus of claim 2, wherein the predetermined direction is a main scanning line direction.

4. Apparatus of claim 2, wherein the predetermined direction is a sub-scanning line direction.

5. Apparatus of claim 1, further comprising:
   a handedness information acquisition part, coupled to said mark display part, which prompts the user to input handedness information that indicates whether the user operates said touch panel with the user's left hand or right hand; wherein said mark display part changes the densities of the marks based on the handedness information obtained by said handedness information acquisition part.

6. Apparatus of claim 5, wherein said mark display part displays the marks such that the densities of the marks in regions nearer to the edge on the side of the user's dominant hand in the main scanning line direction becomes higher than in regions farther from the edge, in accordance with the handedness information obtained by said handedness information acquisition part.

7. Apparatus of claim 1, further comprising:
   a distance computation part, coupled to said calibration part, which determines the distance between an operation position on said touch panel and a position which had been entered before the operation that corresponds to the operation position, based on the operation position calibrated by said calibration part.

8. Apparatus of claim 1, further comprising:
a usage angle acquisition part, coupled to said calibration pan, which obtains the angle of said touch panel to a support that supports said touch panel; wherein
said touch panel changes said direction on the display screen in response to a change in the angle obtained by said usage angle acquisition part.

9. Apparatus of claim 1, wherein, in a segment between a first mark and a second mark, said calibration part calibrates the operation position so that the relation between the operation position and the amount of the calibration to the operation position is non-linear, based on (a) at least one operating position relative to the first mark, (b) at least one operating position relative to the second mark, and (c) at least one operating position relative to a mark which is other than the first mark and the second mark.

10. A method comprising the steps of:
obtaining calibration functions in a system having a touch panel for monitoring and calibrating operation positions entered by a user on a display screen, the calibration functions corresponding to each of at least two segments having respective distances along a predetermined direction on the display screen, the distances not being equal and the predetermined direction being based at least in part on usage angle information, wherein the predetermined direction is a direction selected from the group consisting of a main scanning line direction and a sub-scanning line direction;
reading operation positions entered on the touch panel; and
calibrating the operation position using one of said obtained calibration functions for the segment corresponding to the read operation position and determining the input coordinates.

11. A program product comprising:
a computer usable medium having computer readable program code embodied therein for execution on a computer having a touch panel for monitoring and calibrating operation positions entered by a user on a display screen, the computer readable program code in said program product being effective when executing to:
display a plurality of marks indicating operation target positions on the display screen such that the distance between at least three successive marks along a predetermined direction progressively lessens along the predetermined direction, wherein the predetermined direction is a direction selected from the group consisting of a main scanning line direction and a sub-scanning line direction;
read operation positions entered on the touch panel;
obtain relative positions of the read operation positions relative to the display position of the displayed marks; and
calibrate the operation position in a new operation different from an operation applied when the relative positions were obtained.

12. A program product comprising:
a computer usable medium having computer readable program code embodied therein for execution on a computer having a touch panel for monitoring and calibrating operation positions entered by a user on a display screen, the computer readable program code in said program product being effective when executing to:
obtain respective calibration functions corresponding to each of at least two segments having distances that differ from each other along a predetermined direction on the display screen, wherein the predetermined direction is a direction selected from the group consisting of a main scanning line direction and a sub-scanning line direction;
read operation positions entered on the touch panel; and
calibrate the operation position using one of said obtained calibration functions for the segment corresponding to the read operation position and determine the input coordinates.

* * * * *